(12) United States Patent
Brown et al.

(10) Patent No.: US 12,265,559 B2
(45) Date of Patent: *Apr. 1, 2025

(54) SYSTEM AND METHODS FOR CATEGORIZING CAPTURED DATA

(71) Applicant: Strider Technologies, Inc., South Jordan, UT (US)

(72) Inventors: Michael Brown, Broadlands, VA (US); Greg Levesque, Salt Lake City, UT (US); Eric Harnden, Fort Benning, GA (US); Jonathan Lentz, Leesburg, VA (US)

(73) Assignee: Strider Technologies, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,091

(22) Filed: Jan. 4, 2024

(65) Prior Publication Data

US 2024/0143634 A1    May 2, 2024

Related U.S. Application Data

(63) Continuation of application No. 17/985,900, filed on Nov. 13, 2022, now Pat. No. 11,868,379, which is a continuation of application No. 17/734,083, filed on May 1, 2022, now Pat. No. 11,531,691.

(51) Int. Cl.
| | | |
|---|---|---|
| *G06F 7/00* | (2006.01) | |
| *G06F 16/31* | (2019.01) | |
| *G06F 16/35* | (2019.01) | |

(52) U.S. Cl.
CPC .......... *G06F 16/313* (2019.01); *G06F 16/35* (2019.01)

(58) Field of Classification Search
CPC ...... G06F 16/313; G06F 16/35; G06F 16/215; G06F 16/2428; G06F 16/24575; G06F 16/23; G06F 16/435; G06F 16/254; G06F 16/951; G06F 16/242; G06F 40/56;
(Continued)

(56) References Cited

U.S. PATENT DOCUMENTS

| | | | |
|---|---|---|---|
| 7,272,637 B1 * | 9/2007 | Himmelstein | ........ G06F 16/951 715/780 |
| 9,843,448 B1 * | 12/2017 | Hodge | ..................... H04M 1/67 |
| 11,531,691 B1 | 12/2022 | Brown et al. | |

(Continued)

FOREIGN PATENT DOCUMENTS

JP     2004234686 A     8/2004

*Primary Examiner* — Mohammad A Sana
(74) *Attorney, Agent, or Firm* — Blank Rome LLP

(57) ABSTRACT

An entity may want to capture personal data associated with one or more individuals. Personal data can include, for example, phone number(s), physical address(es), job titles, email address(es), or any other item of personal identifying information. The entity may be able to find such personal data via a variety of different data sources. For example, the entity may be able to find such personal data via tens, hundreds, thousands, or millions of different websites, documents, files, etc. The entity may also want to categorize the captured personal data by individual. For example, the entity may capture first personal data associated with a first individual from a number of different data sources and second personal data associated with a second individual from a number of different data sources.

20 Claims, 11 Drawing Sheets

(58) Field of Classification Search
CPC ... G06F 40/18; G06F 40/177; G06Q 30/0201;
G06Q 10/10; G06Q 10/101
See application file for complete search history.

(56) References Cited

U.S. PATENT DOCUMENTS

| | | | |
|---|---|---|---|
| 11,868,379 B2 | 1/2024 | Brown et al. | |
| 2016/0292240 A1* | 10/2016 | Diwan | G06F 16/254 |
| 2018/0336404 A1* | 11/2018 | Hosabettu | G06V 30/414 |
| 2019/0095582 A1* | 3/2019 | Waits | G16H 20/10 |
| 2019/0102620 A1* | 4/2019 | Siddiq | G06F 16/24575 |
| 2021/0365816 A1 | 11/2021 | Sears et al. | |

* cited by examiner

| NAME | Phone Number | Physical Address |
|---|---|---|
| Anne | 123-6666 | 123 First Street, State, USA |
| Ben | 123-7777 | 123 Second Street, State, USA |
| Charles | 123-8888 | 123 Third Street, State, USA |
| Drew | 123-9999 | 123 Fourth Street, State, USA |

602 — Anne
Title: Vice President
Email: anne@company1.com
Phone: 123-6666
Address: 123 First Street, State, USA 604 — Anne
Phone: 456-6666
Address: 456 Fifth Street, State, USA 606 — Ben
Title: Secretary
Email: ben@company1.com
Phone: 123-7777
Address: 123 Second Street, State, USA 608 — Brittany
Phone: 456-7777
Address: 456 Sixth Street, State, USA 610 — Cassie
Phone: 456-8888
Address: 456 Seventh Street, State, USA 612 — Charles
Title: Chief Operating Officer
Email: charles@company1.com
Phone: 123-8888
Address: 123 Third Street, State, USA 614 — Dan
Phone: 456-9999
Address: 456 Eighth Street, State, USA 616 — Drew
Title: Middle Manager
Email: drew@company1.com
Phone: 123-9999
Address: 123 Fourth Street, State, USA

```
┌─────────────────────────────────────────────────────────────────────┐
│ Determine at least one table included in first content, wherein the │
│   at least one table includes a first plurality of rows and a       │
│              first plurality of columns 702                         │
└─────────────────────────────────────────────────────────────────────┘
                                    ↓
┌─────────────────────────────────────────────────────────────────────┐
│ Determine that a first term indicative of a personal name is        │
│ included in a first row of the first plurality of rows and a first  │
│            column of the first plurality of columns                 │
│                              704                                    │
└─────────────────────────────────────────────────────────────────────┘
                                    ↓
┌─────────────────────────────────────────────────────────────────────┐
│ Identify a second row of the first plurality of rows that includes  │
│ at least a first personal name in the first column, a first item of │
│ personal identifying information in a second column of the first    │
│ plurality of columns, and a second item of personal identifying     │
│ information in a third column of the first plurality of columns 706 │
└─────────────────────────────────────────────────────────────────────┘
                                    ↓
┌─────────────────────────────────────────────────────────────────────┐
│ Extract first data indicative of the first personal name, the first │
│ item of personal identifying information, and the second item of    │
│                  personal identifying information                   │
│                              708                                    │
└─────────────────────────────────────────────────────────────────────┘
                                    ↓
┌─────────────────────────────────────────────────────────────────────┐
│ Add the first data to a first profile associated with the first     │
│                       personal name 710                             │
└─────────────────────────────────────────────────────────────────────┘
                                    ↓
                                  ┌─────┐
                                  │ 712 │
                                  └─────┘
```

Determine at least one table included in first content, wherein the at least one table includes a first plurality of rows and a first plurality of columns 802

Determine that a first term indicative of a personal name is included in a first row of the first plurality of rows and a first column of the first plurality of columns 804

Identify a second row of the first plurality of rows that includes at least a first personal name in the first column and a first item of personal identifying information in a second column of the first plurality of columns 806

Extract first data indicative of the first personal name and the first item of personal identifying information 808

Add the first data to a first profile associated with the first personal name 810

Determine a different table included in second content, wherein the different table includes a second plurality of rows and a second plurality of column 812

Determine that a second term indicative of a personal name is included in a first row of the second plurality of rows and a first column of the second plurality of columns 814

Identify a second row of the second plurality of rows that includes the first personal name in the first column of the second plurality of columns and a second item of personal identifying information in a second column of the second plurality of columns 816

Extract second data indicative of the first personal name and the second item of personal identifying information 818

Maintain the second data in a second profile associated with the first personal name based on determining that the second item of personal identifying information conflicts with the first item of personal identifying information 820

FIG. 8

SYSTEM AND METHODS FOR CATEGORIZING CAPTURED DATA

CROSS REFERENCE TO RELATED APPLICATIONS

This application is a continuation of U.S. patent application Ser. No. 17/985,900, filed Nov. 13, 2022, which will issue as U.S. Pat. No. 11,868,379 on Jan. 9, 2024, which is a continuation of U.S. patent application Ser. No. 17/734,083, filed May 1, 2022, and issued as U.S. Pat. No. 11,531,691 on Dec. 20, 2022, the disclosures of which are hereby incorporated by reference herein.

BACKGROUND

Entities, such as companies or individuals, increasingly need to analyze, extract information from, categorize, or otherwise deal with data from a variety of data sources. However, the large quantity of available data sources and/or the complexity of such data sources may effectively prohibit entities from performing such data processing tasks. Accordingly, improved techniques for data capture and data categorization are desirable.

SUMMARY

Methods and systems are disclosed for data capture and categorization. In embodiments, at least one table included in first content may be determined. The at least one table includes a first plurality of rows and a first plurality of columns. The first content may include content, for example, from a first website. It may be determined that a first term indicative of a personal name is included in a first row of the first plurality of rows and a first column of the first plurality of columns. A second row of the first plurality of rows that includes at least a first personal name in the first column and a first item of personal identifying information in a second column of the first plurality of columns may be identified. First data indicative of the first personal name and the first item of personal identifying information may be extracted. The first data may be added to a first profile associated with the first personal name.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 illustrates an example table including personal identifying information.

FIG. 6 illustrates an example set of profiles.

FIG. 7A illustrates an example method for data capture and categorization.

FIG. 8 illustrates an example method for data capture and categorization.

DETAILED DESCRIPTION OF ILLUSTRATIVE EMBODIMENTS

An entity may want to capture personal data associated with one or more individuals. Personal data can include, for example, phone number(s), physical address(es), job titles, email address(es), or any other item of personal identifying information. The entity may be able to find such personal data via a variety of different data sources. For example, the entity may be able to find such personal data via tens, hundreds, thousands, or millions of different websites, documents, files, etc. The entity may also want to categorize the captured personal data by individual. For example, the entity may capture first personal data associated with a first individual from a number of different data sources and second personal data associated with a second individual from a number of different data sources. The entity may want to organize the first personal data in a first central location associated with the first individual. Likewise, the entity may want to organize the second personal data in a second central location associated with the second individual. In this manner, the entity may be able to quickly gain a comprehensive understanding of all personal data associated with a particular individual.

However, due to the large quantity of data sources available nowadays, it may be difficult or impossible for the entity to locate all of the data sources that include the desired personal data. For example, it may be impossible for an entity to manually locate hundreds, thousands, or millions of data sources that include the desired personal data. Even if the entity manages to locate and capture the desired personal data from hundreds, thousands, or millions of data sources, the large quantity of data sources may still prohibit the entity from accurately and efficiently organizing the captured personal data according to individual.

Accordingly, techniques for capturing and categorizing data in a more efficient and accurate manner are desirable. Such a technique involves automatically identifying tables that contain personal identifying information in a plurality of different data sources, extracting the personal identifying information from such tables, and categorizing the extracted personal identifying information by individual. Unlike traditional data capture and categorization techniques, this technique allows for efficient and comprehensive data capture and categorization—thus facilitating an entity's ability to gain a comprehensive understanding of all personal data associated with various individual without having to manually sort through a large number of data sources.

Figure 1:
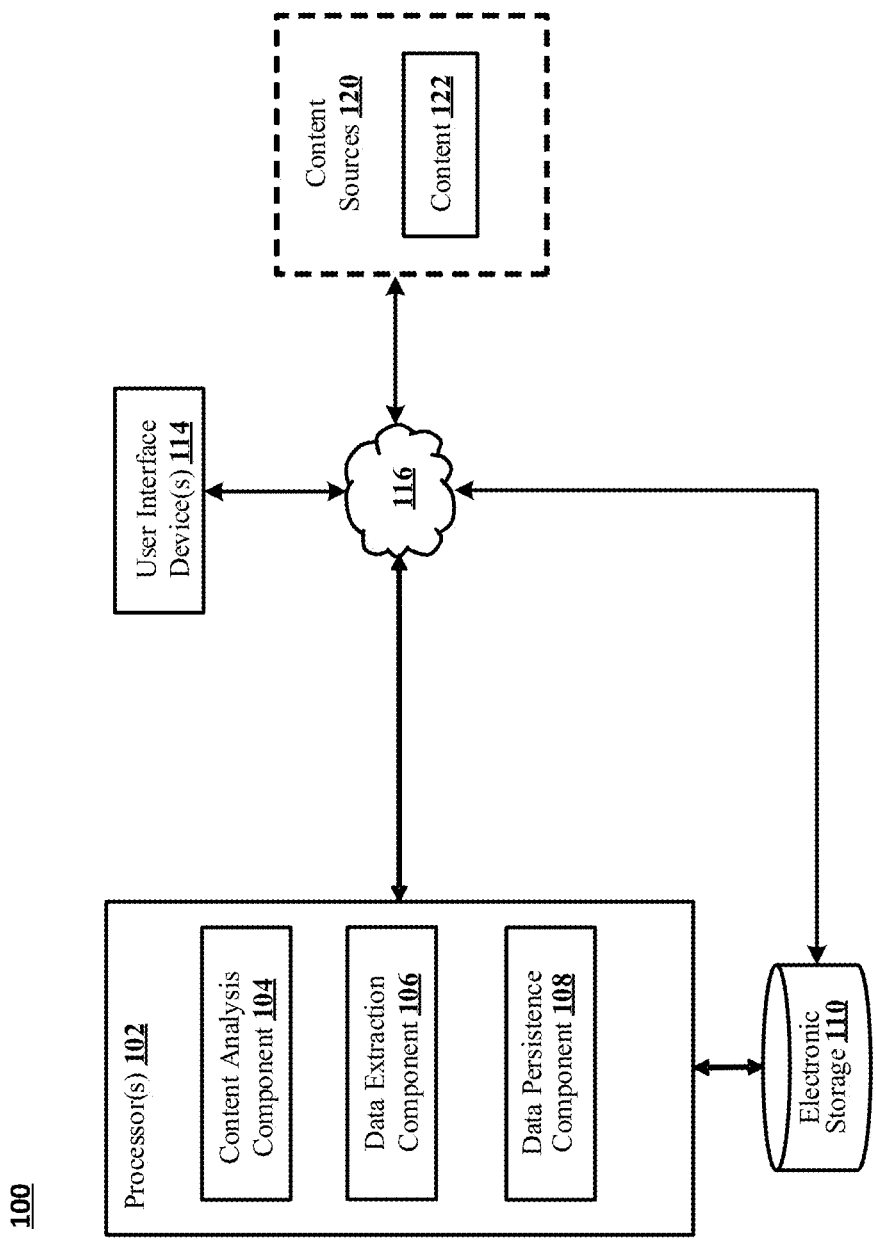
FIG. 1 illustrates a block diagram of an example environment.

FIG. 1 illustrates an example hardware and network configuration in which the systems and methods described herein may be implemented. Such a hardware and network system 100 includes a processor 102, a database 110, at least one user interface device 114, and at least one content source 120. The processor 102, database 110, at least one user interface device 114, and at least one content source 120 are in communication via a network 116. The processor 102 may be in communication with the database 110. The processor 102 may cause data to be stored in the database 110 and/or receive data stored in the database 110. The database 110 may store a variety of different data.

The processor 102, electronic storage 110, user interface device(s) 114, and content source(s) 120 may each comprise one or more computing devices and/or network devices. The network 116 may comprise one or more public networks (e.g., the Internet) and/or one or more private networks. A private network may include a wireless local area network (WLAN), a local area network (LAN), a wide area network (WAN), a cellular network, or an intranet. The network 116 may comprise wired network(s) and/or wireless network(s).

The processor 102 may be configured to receive capture and categorize data. The processor 102 may include a variety of different components. For example, the processor may include a content analysis component 104, a data extraction component 106, and/or a data organization component 108. One or more of these components 104, 106, 108 may be used to capture and categorize data from a large quantity of data sources.

In embodiments, the processor 102 includes the content analysis component 104. The content analysis component 104 may be configured to receive content 122 from the content source(s) 122. The content 122 may include digital content or non-digital content that may be digitized. For example, the content 122 may include documents, files, articles, webpages, etc. The content source(s) 122 may include any source of digital or non-digital content, including but not limited to website providers, digital content providers, books, brochures, pamphlets. There may be tens, hundreds, thousands, or millions of content sources 120. To receive the content 122, the content analysis component 104 may retrieve the content 122. Alternatively, the content 122 may be sent to the content analysis component 104.

The content analysis component 104 may be configured to determine whether received content 122 includes one or more tables. A table, as used herein, refers to a set of data systematically displayed in rows and columns. To determine whether a particular item of received content 122 includes one or more tables, the content analysis component 104 may scan the content 122 or may perform any other suitable technique for identifying the existence (or lack thereof) of a table. If a particular item of content 122 does not include at least one table, the processor 102 may not perform any further processing on that particular item of content.

If the content analysis component 104 determines that one or more tables are included in a particular item of content 122, the content analysis component 104 may be configured to determine whether the table(s) includes a header row. As used herein, a "header row" is a row in a table that includes labels in each column that indicate a type of data that is stored in the other rows of each column. The header row is commonly the first row in a table, but in some embodiments, may be the last row, second row, etc. To determine whether an identified table includes a header row, the content analysis component 104 may scan the table or may perform any other suitable technique for identifying the existence (or lack thereof) of a header row. For example, the content analysis component 104 may search for a row of the table that includes labels commonly included in header rows. If an identified table does not include a header row, the processor 102 may not perform any further processing on that table.

If the content analysis component 104 determines that one or more identified tables includes a header row, the content analysis component 104 may be configured to determine whether the header row includes, in any column, a label indicative of a personal name. A label indicative of a personal name is not an actual personal name. Rather, a label indicative of a personal name may be, for example, the word "name" or characters for "name" written in any language, the phrases "legal name," "English name," "First and Last Name" (in any language) etc. It should be appreciated that these labels indicative of a personal name are just examples, and that any other label indicative of a personal name may instead be included in the header row. To determine whether a header row includes a label indicative of a personal name, the content analysis component 104 may scan the table, perform natural language processing techniques, or may perform any other suitable technique for identifying the existence (or lack thereof) of such a label. If a header row in an identified table does not include, in any column, a label indicative of a personal name, the processor 102 may not perform any further processing on that table.

In certain embodiments, the content analysis component 104 may determine a language associated with the content. For example, the content analysis component 104 may determine whether the content contains English, Spanish, French, Russian, Mandarin, etc. The content analysis component 104 may determine whether the header row includes, in any column, a label indicative of a personal name in that language. For example, the content analysis component 104 may determine whether the header row includes, in any column, at least one of a word, phrase, letter, or character associated with the language that is indicative of personal names but does not comprise a first name or a last name of an individual.

If the content analysis component 104 determines that a header row of a particular table includes a label indicative of a personal name in a first column, the content analysis component 104 may be configured to determine whether at least one other column of that table includes personal identifying information. For example, the content analysis component 104 may be configured to determine whether at least one other column of that table includes phone number(s), physical address(es), job titles, email address(es), or any other item of personal identifying information. To determine whether at least one other column of the table includes personal identifying information, the content analysis component 104 may scan the table or may perform any other suitable technique for identifying the existence (or lack thereof) of personal identifying information. If an identified table does not include at least one other that includes personal identifying information, the processor 102 may not perform any further processing on that table.

In embodiments, the processor 102 includes the data extraction component 106. If the content analysis component 104 determines that one or more identified tables include both a header row that includes, in a first column, a label indicative of a personal name and at least one other column that includes personal identifying information, the content analysis component 104 may be configured to send (i.e., forward), to the data extraction component 106, the table(s). The data extraction component 106 may be configured to receive the table(s).

The data extraction component 106 may be configured to extract any or all rows of the table(s) except for the header row. For example, if the header row of a ten-row table is the first row, the data extraction component 106 may be configured to extract all nine rows of the table subsequent to the first row. Each extracted row may include, for example, a personal name and one or more items of personal identifying information corresponding to the personal name. For example, each extracted row may include a personal name corresponding to an individual and one or more of phone number(s), physical address(es), job titles, email address(es), or any other item of personal identifying information associated with that individual. The data extraction component 106 may not extract empty/blank rows, or rows with missing data in one or more columns.

In embodiments, the processor 102 includes the data organization component 108. The data organization component 108 may be configured to organize the extracted data according to personal name (i.e., by individual). For example, the data organization component 108 may create a hash of the personal name in a particular row and associate all of the other raw data indicative of one or more items of personal identifying information in that row to the personal name. In this manner, the data organization component 108 may invert the extracted data so that it is arranged according to personal name. Arranging the extracted data according to personal name may provide an entity with the ability to gain a quick and comprehensive overview of the personal details associated with a particular individual.

In embodiments, the data organization component 108 may be configured to send the organized data or persist the organized data to the database(s) 110. The database(s) 110 may receive the organized data and maintain it in profiles according to personal name. For example, the database(s) 110 may receive the hash of a first personal name and all other associated raw data indicative of one or more items of personal identifying information and maintain the raw data indicative of one or more items of personal identifying information in a profile associated with the first personal name. The profile(s) may be viewed, such as by an entity, via one or more user interface device(s) 114. The user interface device(s) 114 may include at least one of a tablet, phone, smart phone, computer, laptop, television, etc. An exemplary profile is discussed below with regard to FIG. 6.

In embodiments, the content analysis component 104 may identify, for further processing by the data extraction component 106, two or more tables that include the same personal name. FIGS. 2-5 show example tables that each include one or more of the same personal names. If two or more tables include the same personal name, each of those tables may include personal identifying information associated with a single individual having the personal name. If the two or more tables each include personal identifying information associated with a single individual having the personal name, then the data organization component 108 will organize all of this personal identifying information, extracted from each of the two or more tables, in a single profile associated with the single individual.

Figure 2:
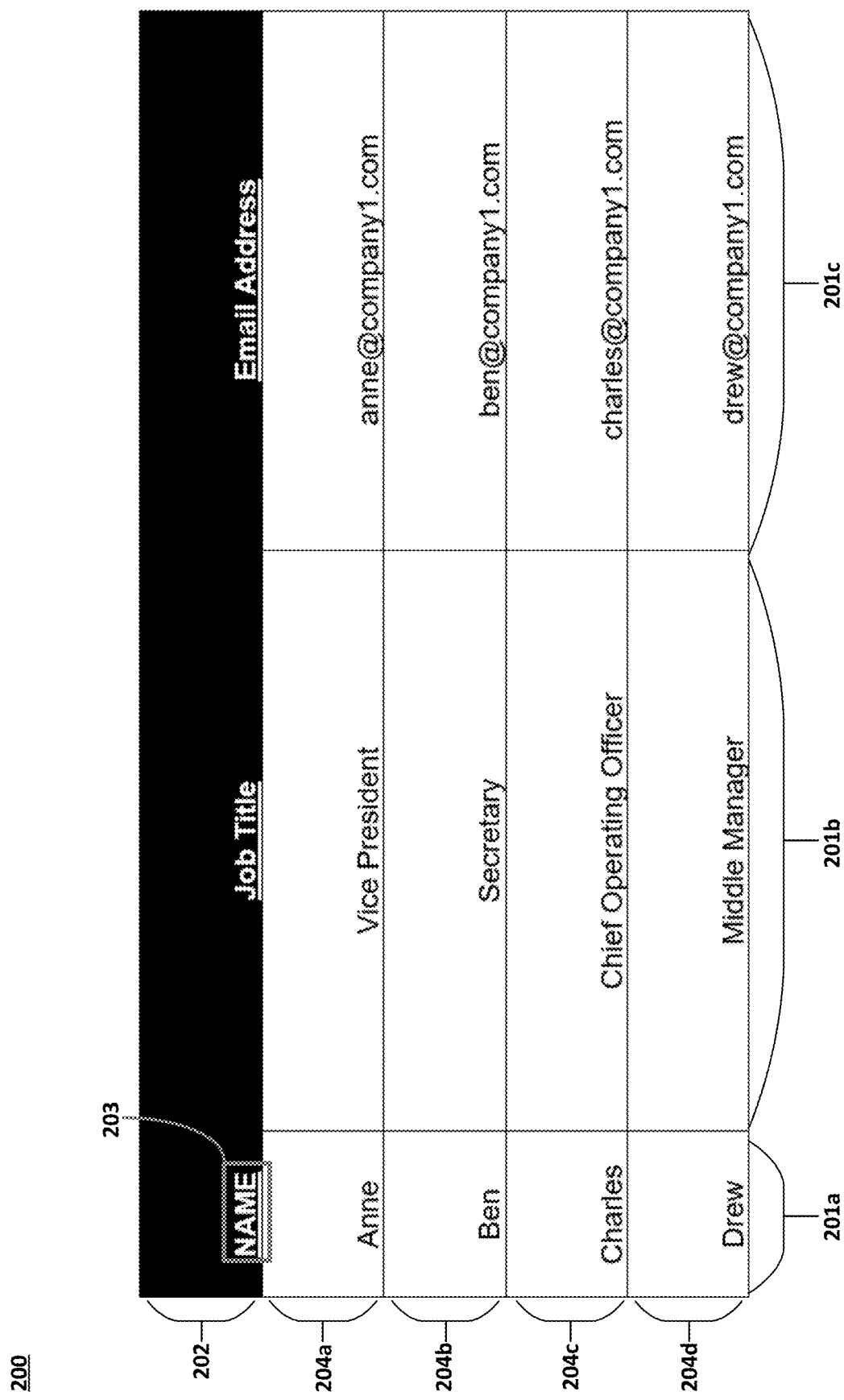
FIG. 2 illustrates an example table including personal identifying information.

For example, the content analysis component 104 may identify the table 200 depicted in FIG. 2. The table 200 includes header row 202, subsequent rows 204a-d, and columns 201a-c. The content analysis component 104 may identify the table 200 in a first item of content 122, such as in a document or file from a first website. The header row 202 includes, in column 201a, a label 203 indicative of a personal name. The label 203 is "name," but it should be appreciated that in other embodiments, any other word, phrase, or set of characters (in any language), may instead be a label indicative of a personal name. The other columns 201b-c include personal identifying information. For example, the column 201b includes a first item of personal identifying information (i.e., job title), and the column 201c includes a second item of personal identifying information (i.e., email address).

Each of the subsequent rows 204a-d are associated with a particular individual having the personal name listed in the column 201a. For example, row 204a is associated with an individual named "Anne" The other columns in row 204a indicate that Anne has a job title of "Vice President," and an email address of "anne@company1.com." Row 204b is associated with an individual named "Ben" The other columns in row 204b indicate that Ben has a job title of "Secretary," and an email address of "ben@company1.com." Row 204c is associated with an individual named "Charles." The other columns in row 204c indicate that Charles has a job title of "Chief Operating Officer," and an email address of "charles@company1.com." Finally, row 204d is associated with an individual named "Drew" The other columns in row 204d indicate that Drew has a job title of "Middle Manager," and an email address of "drew@company1.com."

Figure 3:
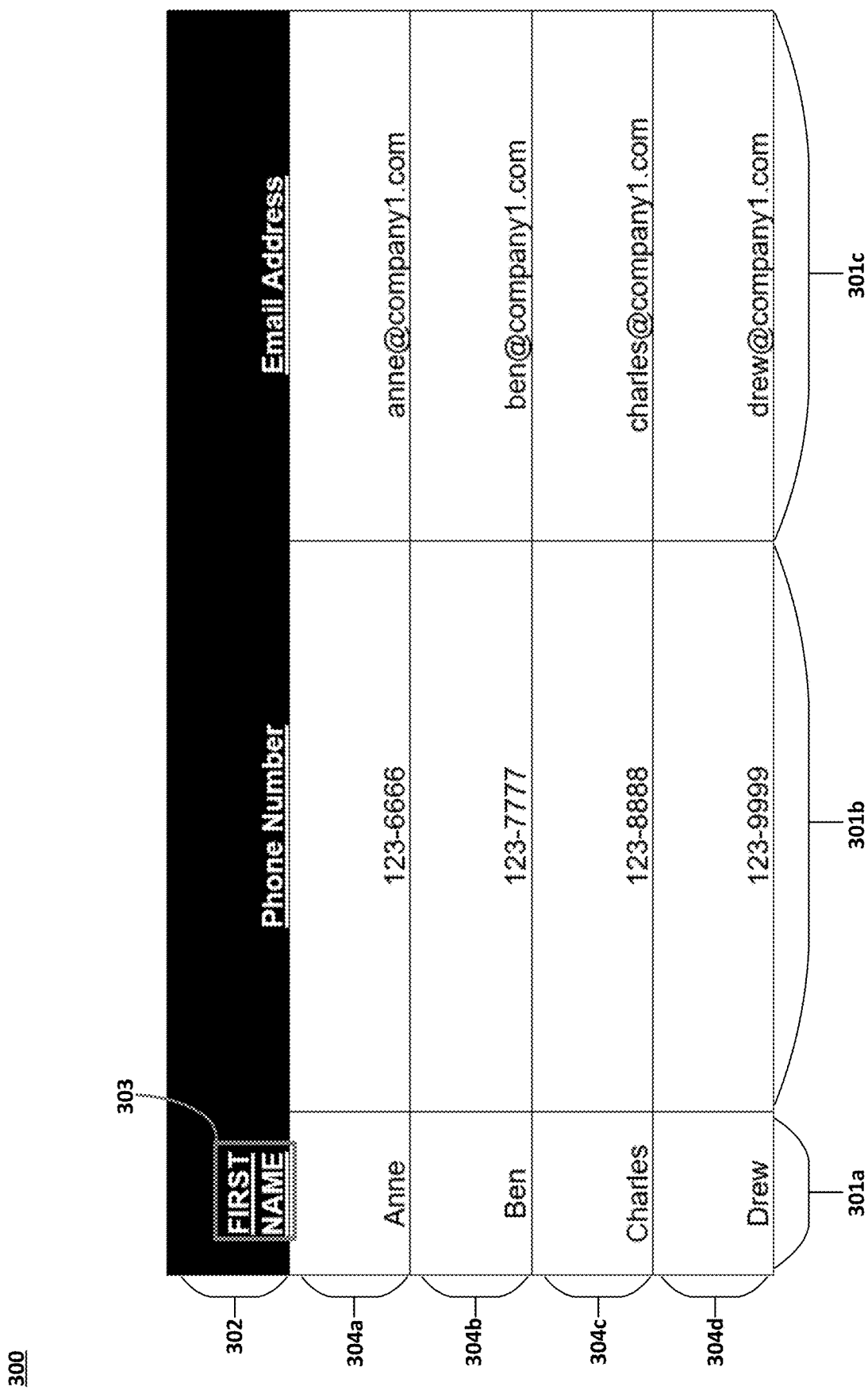
FIG. 3 illustrates an example table including personal identifying information.

In addition to identifying table 200, the content analysis component 104 may further identify the table 300 depicted in FIG. 3. The table 300 includes header row 302, subsequent rows 304a-d, and columns 301a-c. The content analysis component 104 may identify the table 300 in a second item of content 122, such as in a document or file from a second website. However, in some embodiments, the content analysis component 104 may identify the table 300 in the same, first item of content 122 in which the table 200 was identified.

The header row 302 includes, in column 301a, a label 303 indicative of a personal name. The label 303 is "first name," but it should be appreciated that in other embodiments, any other word, phrase, or set of characters (in any language), may instead be a label indicative of a personal name. The other columns 301b-c include personal identifying information. For example, the column 301b includes a first item of personal identifying information (i.e., phone number), and the column 301c includes a second item of personal identifying information (i.e., email address).

Each of the subsequent rows 304a-d are associated with a particular individual having the personal name listed in the column 301a. For example, row 304a is associated with an individual named "Anne" The other columns in row 304a indicate that Anne has a phone number of "123-6666," and an email address of "anne@company1.com." Row 304b is associated with an individual named "Ben" The other columns in row 304b indicate that Ben has a phone number of "123-7777," and an email address of "ben@company1.com." Row 304c is associated with an individual named "Charles." The other columns in row 304c indicate that Charles has a phone number of "123-8888," and an email address of "charles@company1.com." Finally, row 304d is associated with an individual named "Drew" The other columns in row 304d indicate that Drew has a phone number of "123-9999," and an email address of "drew@company1.com."

As shown in FIGS. 2-3, the table 200 and the table 300 share the same four personal names (i.e., Anne, Ben, Charles, Drew) in the columns 201a and 301a, respectively. It can be determined that the four personal names included in the table 200 and the four personal names included in the table 300 correspond to the same four individuals because each of the four personal names is associated with the same item of personal identifying information (i.e., email address) in both tables 200, 300. For example, because both the table 200 and the table 300 include the same email address ("anne@company1.com") for the personal name Anne, it can be determined that the individual named Anne that is included in table 200 is the same individual named Anne that is included in table 300. This determination can be made because it is highly unlikely (or impossible) for two different individuals to share the same email address. A similar determination can be made that the Ben, Charles, and Drew included in the table 200 are the same Ben, Charles, and Drew included in the table 300, due to the shared item of personal identifying information (i.e., email address).

In certain embodiments, more than two tables that include the same personal name. For example, in addition to identifying table 200 and the table 300, the content analysis component 104 may further identify the table 400 depicted in FIG. 4. The table 400 includes header row 402, subsequent rows 404a-d, and columns 401a-c. The content analysis component 104 may identify the table 400 in a third item of content 122, such as in a document or file from a third website. However, in some embodiments, the content analysis component 104 may identify the table 400 in the same item of content 122 in which the table 200 and/or the table 300 was identified.

The header row 402 includes, in column 401a, a label 403 indicative of a personal name. The label 403 is "name," but it should be appreciated that in other embodiments, any other word, phrase, or set of characters (in any language), may instead be a label indicative of a personal name. The other columns 401b-c include personal identifying information. For example, the column 401b includes a first item of personal identifying information (i.e., phone number), and the column 401c includes a second item of personal identifying information (i.e., physical address).

Each of the subsequent rows 404a-d are associated with a particular individual having the personal name listed in the column 401a. For example, row 404a is associated with an individual named "Anne" The other columns in row 404a indicate that Anne has a phone number of "123-6666," and a physical address of "123 First Street, State, USA." Row 404b is associated with an individual named "Ben" The other columns in row 404b indicate that Ben has a phone number of "123-7777," and a physical address of "123 Second Street, State, USA." Row 404c is associated with an individual named "Charles." The other columns in row 404c indicate that Charles has a phone number of "123-8888," and a physical address of "123 Third Street, State, USA." Finally, row 404d is associated with an individual named "Drew" The other columns in row 404d indicate that Drew has a phone number of "123-9999," and a physical address of "123 Fourth Street, State, USA."

As shown in FIGS. 2-4, the tables 200, 300, and 400 share the same four personal names (i.e., Anne, Ben, Charles, Drew) in the columns 201a, 301a, and 401a, respectively. As described above, it has already been determined that the four personal names included in the table 200 and the four personal names included in the table 300 correspond to the same four individuals because each of the four personal names is associated with the same item of personal identifying information (i.e., email address) in both tables 200, 300. It can also be determined that the four personal names included in the table 300 and the four personal names included in the table 400 correspond to the same four individuals because each of the four personal names is associated with the same item of personal identifying information (i.e., phone number) in both tables 300, 400.

For example, because both the table 300 and the table 400 include the same phone number ("123-6666") for the personal name Anne, it can be determined that the individual named Anne that is included in table 300 is the same individual named Anne that is included in table 400. This determination can be made because it is highly unlikely (or impossible) for two different individuals to share the same phone number. A similar determination can be made that the Ben, Charles, and Drew included in the table 300 are the same Ben, Charles, and Drew included in the table 400, due to the shared item of personal identifying information (i.e., phone number).

The four personal names included in the table 200 and the four personal names included in the table 400 are not associated with any of the same items of personal identifying information in the tables 200, 400. For example, the table 200 indicates that an individual by the name of Anne has a job title of "Vice President," and an email address of "anne@company1.com." The table 400 indicates that an individual by the name of Anne has a phone number of "123-6666," and a physical address of "123 First Street, State, USA." Because there is no common item of personal identifying information between tables 200 and 400, it is not clear whether the Anne included in the table 200 is the same Anne included in the table 400.

However, because it has already been determined that the Anne included in the table 200 is the same Anne included in the table 300 (by virtue of having the same email address), and that the Anne included in the table 300 is the same Anne included in the table 400 (by virtue of having the same phone number), it can also be determined, using the transitive property, that the Anne included in the table 200 is the same Anne included in the table 400. A similar determination can be made, using the transitive property, that the Ben, Charles, and Drew included in the table 200 are the same Ben, Charles, and Drew included in the table 400.

As described above, if two or more tables each include personal identifying information associated with a single individual having the personal name, then the data organization component 108 will organize all of this personal identifying information, extracted from each of the two or more tables, in a single profile associated with the single individual. Thus, all of the personal identifying information from tables 200, 300, and 400 may be organized into four profiles: one profile for Anne, one profile for Ben, one profile for Charles, and one profile for Drew. Each profile may indicate a job title, email address, phone number, and physical address associated with the respective individual. For example, Anne's profile may indicate a job title of "Vice President," an email address of "anne@company1.com," a phone number of "123-6666", and a physical address of "123 First Street, State, USA."

This same logic may be used to link together tens, hundreds, thousands, or millions personal names included in tens, hundreds, thousands, or millions of tables from tens, hundreds, thousands, or millions of different sources (content items). Thus, a profile associated with a particular individual may indicate personal identifying information extracted from tens, hundreds, thousands, or millions of different sources. In this manner, a comprehensive profile may be created for a variety of different individuals. Manually creating even one such profile, let alone tens, hundreds, thousands, or millions of these profiles, would be nearly impossible for an entity, unless that entity has unlimited time and unlimited resources.

Alternatively, if two or more tables include the same personal name, those two or more tables may include personal identifying information associated with two or more different individuals having the same personal name (i.e., 2+ people named John Smith). If the two or more tables include personal identifying information associated with two or more different individuals having the same personal name, then the data organization component 108 will organize the personal identifying information, extracted from each of the two or more tables, in more than one profile, with each profile corresponding to a particular individual having the shared name.

Figure 5:
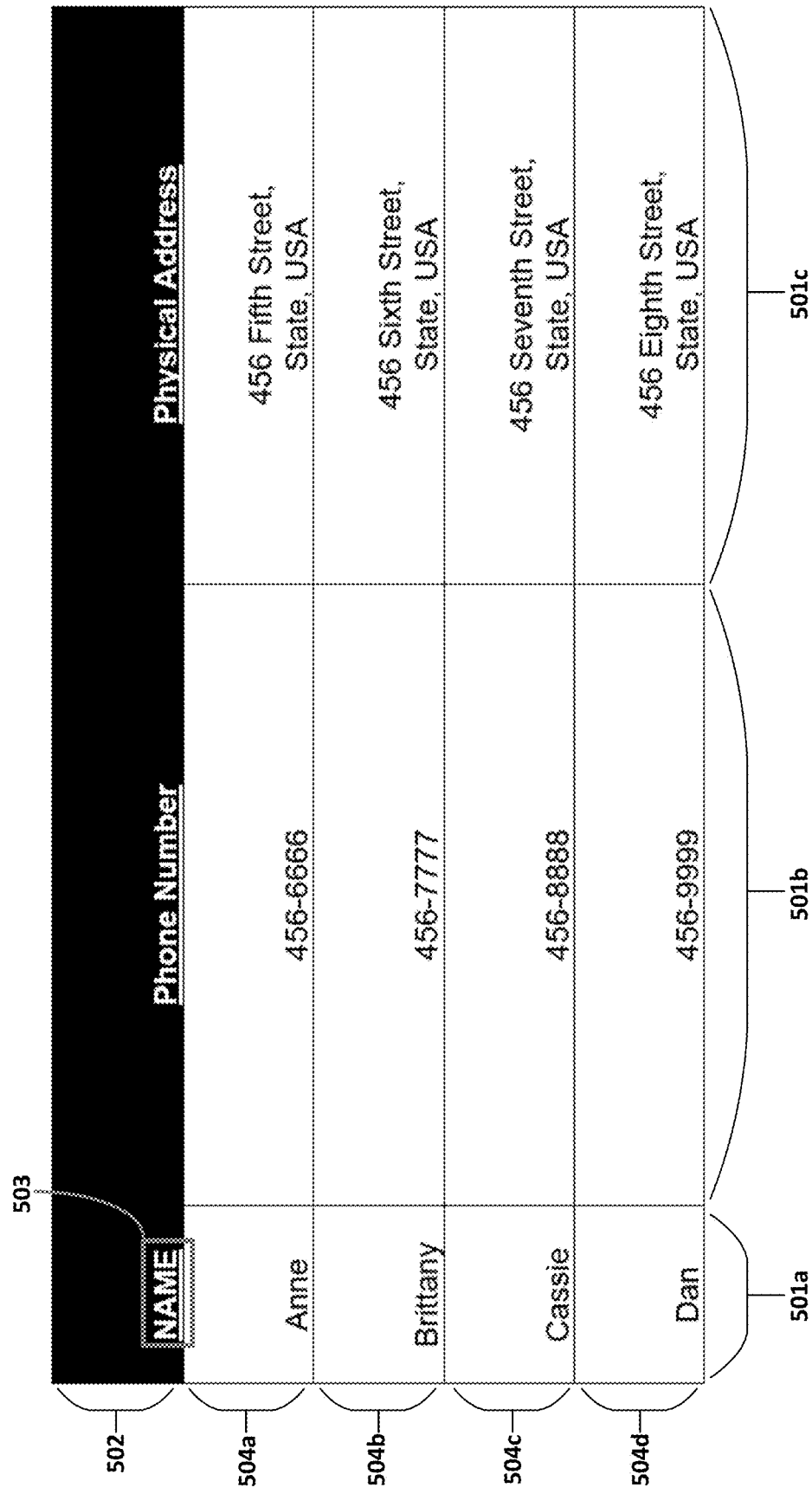
FIG. 5 illustrates an example table including personal identifying information.

In addition to identifying the table 400, the content analysis component 104 may further identify the table 500 depicted in FIG. 5. The table 500 includes header row 502, subsequent rows 504a-d, and columns 501a-c. The content analysis component 104 may identify the table 500 in a fourth item of content 122, such as in a document or file from a fourth website. However, in some embodiments, the content analysis component 104 may identify the table 500 in the same item of content 122 n which the table 200, the table 300, and/or the table 400 was identified.

The header row 502 includes, in column 501a, a label 503 indicative of a personal name. The label 503 is "name," but it should be appreciated that in other embodiments, any other word, phrase, or set of characters (in any language), may instead be a label indicative of a personal name. The other columns 501b-c include personal identifying information. For example, the column 501b includes a first item of personal identifying information (i.e., phone number), and the column 501c includes a second item of personal identifying information (i.e., physical address).

Each of the subsequent rows 504a-d are associated with a particular individual having the personal name listed in the column 501a. For example, row 504a is associated with an individual named "Anne" The other columns in row 504a indicate that Anne has a phone number of "456-6666," and a physical address of "456 Fifth Street, State, USA." Row 504b is associated with an individual named "Brittany" The other columns in row 504b indicate that Brittany has a phone number of "456-7777," and a physical address of "456 Sixth Street, State, USA." Row 504c is associated with an individual named "Cassie." The other columns in row 504c indicate that Cassie has a phone number of "456-8888," and a physical address of "456 Seventh Street, State, USA." Finally, row 504d is associated with an individual named "Dan" The other columns in row 504d indicate that Dan has a phone number of "456-9999," and a physical address of "456 Eighth Street, State, USA."

As shown in FIGS. 4-5, the table 400 and the table 500 share one of the same four personal names (i.e., Anne) in the columns 401a and 501a, respectively. However, it can be determined that the Anne included in the table 400 and the Anne included in the table 500 do not correspond to the same individual because the tables 400 and 500 include conflicting personal identifying information. For example, it can be determined that the Anne included in the table 400 and the Anne included in the table 500 do not correspond to the same individual because the table 400 and the table 500 list different phone numbers for Anne. Likewise, it can be determined that the Anne included in the table 400 and the Anne included in the table 500 do not correspond to the same individual because the table 400 and the table 500 list different physical addresses for Anne. Thus, the Anne included in the table 400 is likely a different Anne included in the table 500, because it is unlikely that a single individual by the name of Anne has two different phone numbers and/or two different physical addresses.

As described above, if two or more tables include personal identifying information associated with more than one individual having the same personal name, then the data organization component 108 will organize all of this personal identifying information, extracted from each of the two or more tables, in more than one profile, with each profile corresponding to a particular individual having the shared name. Thus, the personal identifying information from the table 500 that corresponds to "Anne"," may be organized into a different profile that the profile created for the Anne indicated by tables 200-400. For example, a first profile associated with the name "Anne" may indicate a job title of "Vice President," an email address of "anne@company1.com," a phone number of "123-6666", and a physical address of "123 First Street, State, USA." Additionally, a second profile associated with the name "Anne" may indicate a phone number of "456-6666", and a physical address of "456 Fifth Street, State, USA." Additionally, the personal identifying information extracted from the table 500 that corresponds to the personal names Brittany, Cassie, and Dan may be organized into three different profiles.

This same logic may be used create tens, hundreds, thousands, or millions of different profiles corresponding to the same personal name (but different individuals). For example, this logic may be used to create 2,000 profiles corresponding to the name "Peter Jones," with each of these 2,000 profiles indicating personal identifying information of a different individual by the name of Peter Jones. Again, such a task would be nearly impossible for an entity to manually perform, unless that entity has unlimited time and unlimited resources.

It should be appreciated that while the personal names shown in table 200, the table 300, the table 400, and the table 500 (i.e., Anne, Ben, Charles, Drew, etc.) are first names in the English language, in other embodiments, the personal names shown in an identified table may additionally or alternatively include first and/or last names in any language.

FIG. 6 illustrates an exemplary set of profiles 600 associated with the data extracted from the tables 200, 300, 400, and 500 of FIGS. 2-5. The set of profiles 600 may be stored, for example, in a JSON file (or any other suitable format). The set of profiles 600 includes a profile 602, a profile 604, a profile 606, a profile 608, a profile 610, a profile 612, a profile 614, and a profile 616. However, it should be appreciated that a set of profiles may include many more profiles than this, such as hundreds, thousands, or millions or profiles.

The profile 602 corresponds to the individual by the name of Anne included in the tables 200, 300, and 400. The profile 602 includes the personal identifying information associated with the personal name Anne that was extracted from all of the tables 200, 300, and 400. The set of profiles 600 includes a profile 604. The profile 604 corresponds to the individual by the name of Anne included in the table 500. The profile 604 includes the personal identifying information associated with the personal name Anne extracted from the table 500. The profile 606 corresponds to the individual by the name of Ben included in the tables 200, 300, and 400. The profile 606 includes the personal identifying information associated with the personal name Ben extracted from all of the tables 200, 300, and 400.

The profile 608 corresponds to the individual by the name of Brittany included in the table 500. The profile 608 includes the personal identifying information associated with the personal name Brittany extracted from the table 500. The profile 610 corresponds to the individual by the name of Cassie included in the table 500. The profile 610 includes the personal identifying information associated with the personal name Cassie extracted from the table 500. The profile 612 corresponds to the individual by the name of Charles included in the tables 200, 300, and 400. The profile 612 includes the personal identifying information associated with the personal name Charles extracted from all of the tables 200, 300, and 400. The profile 614 corresponds to the individual by the name of Dan included in the table 500. The profile 614 includes the personal identifying information associated with the personal name Dan extracted from the table 500. The profile 616 corresponds to the individual by the name of Drew included in the tables 200, 300, and 400.

The profile 616 includes the personal identifying information associated with the personal name Drew extracted from all of the tables 200, 300, and 400.

In certain embodiments, one or more of the profiles 602, 604, 606, 608, 610, 612, 614, 616 may include an indication that associates each item of personal identifying information to the content from which it was extracted. For example, the profile 602 includes the personal identifying information associated with the personal name Anne that was extracted from all of the tables 200, 300, and 400. Thus, the profile 602 may include, for each item of personal identifying information, an indication associating that particular item of personal identifying information to the content from which it was extracted. The content may be, for example, a document or file on one or more webpages. In this manner, an entity may be able to look at the profile 602, quickly gain a comprehensive understanding of the personal identifying information associated with the individual, and understand which data sources this personal identifying information came from.

Figure 7B:
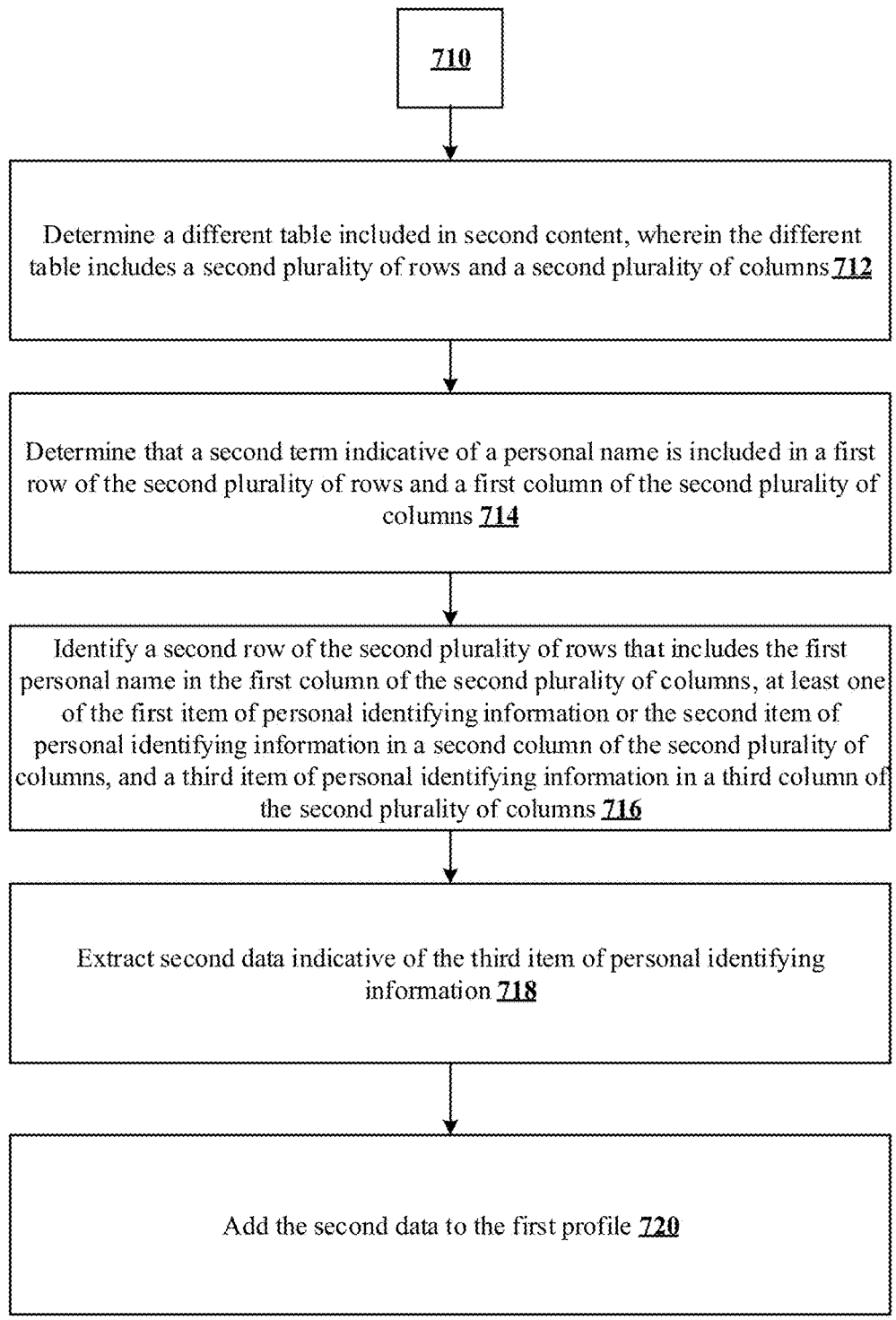
FIG. 7B illustrates an example method for data capture and categorization.
Figure 7C:
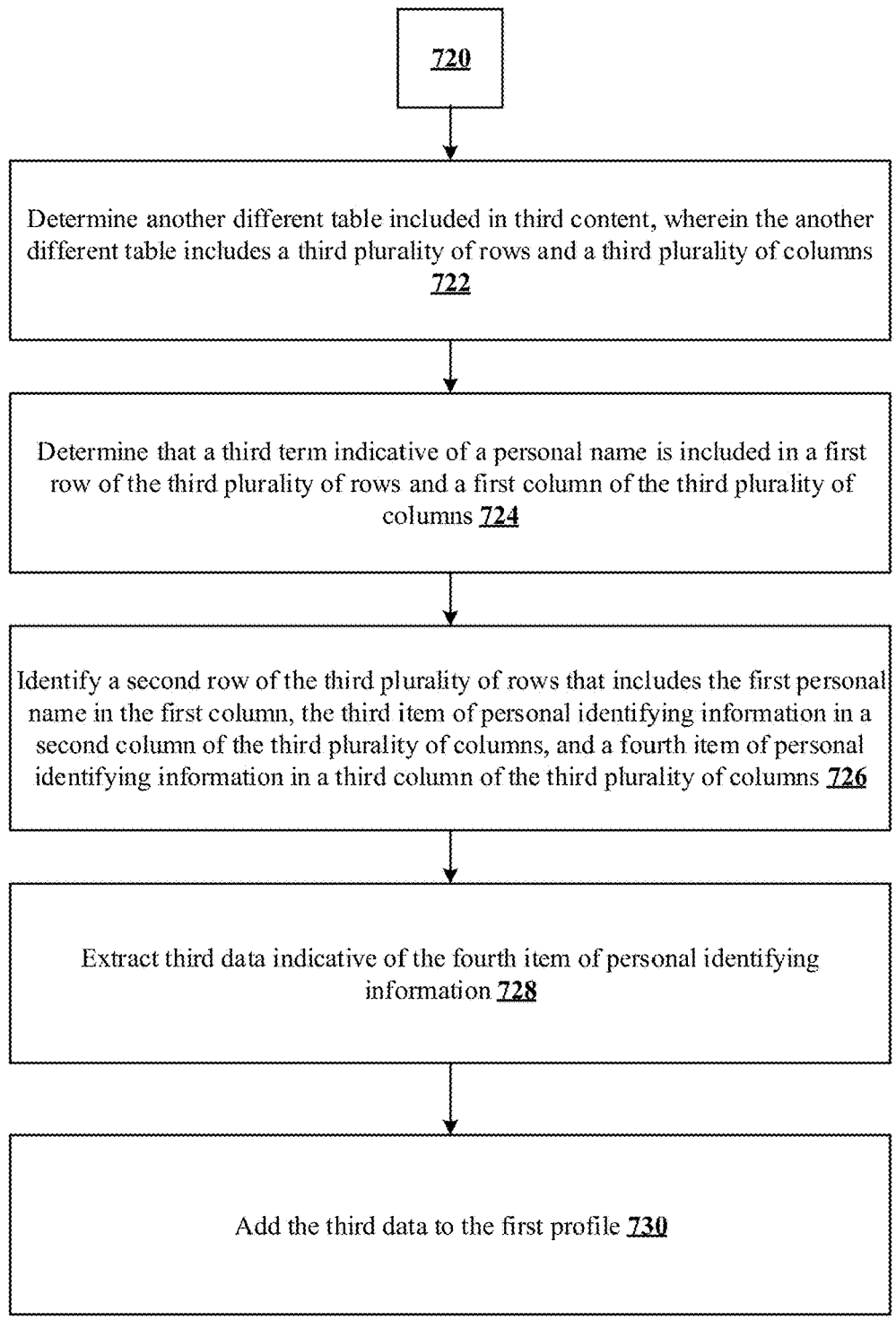
FIG. 7C illustrates an example method for data capture and categorization.

FIGS. 7A, 7B, and 7C illustrates an exemplary method 700 for capturing and categorizing data. The method 700 may be performed, for example, by the processor 102 of FIG. 1. The method 700 may be performed to capture personal identifying information from variety of different data sources, such as tens, hundreds, thousands, or millions of data sources, and organize the captured data into profiles according to individual. In this manner, performance of the method 700 enables entities to quickly gain a comprehensive understanding of various personal details corresponding to particular individuals.

As described above, a processor (i.e., the content analysis component 104) may be configured to determine whether content includes one or more tables. At 702, it may be determined that at least one first table is included in first content. The first table includes a first plurality of rows and a first plurality of columns.

It may be determined that the first table includes a header row. The header row may include, in a first column, a label indicative of a personal name. At 704, it may be determined that a first term (i.e., label) indicative of a personal name is included in a first row (i.e., header row) of the first plurality of rows and a first column of the first plurality of columns. As described above, a label indicative of a personal name is not an actual personal name. Rather, a label indicative of a personal name may be, for example, the word "name" or characters for "name" written in any language, the phrases "legal name," "English name," "First and Last Name" (in any language) etc.

It may be determined that at least one other column of the first table includes personal identifying information. For example, it may be determined that at least one other column of the first table includes phone number(s), physical address(es), job titles, email address(es), or any other item of personal identifying information. At 706, a second row of the first plurality of rows that includes at least a first personal name in the first column, a first item of personal identifying information in a second column of the first plurality of columns, and a second item of personal identifying information in a third column of the first plurality of columns may be identified.

Data from this second row of the first table may be extracted. At 708, first data indicative of the first personal name, the first item of personal identifying information, and the second item of personal identifying information may be extracted. The extracted first data may be organized according to personal name (i.e., by individual). For example, a hash of the first personal name may be created, and the other extracted data indicative the first item of personal identifying information and the second item of personal identifying information may be associated to the first personal name. In this manner, the extracted first data may be inverted so that it is arranged according to personal name. Arranging the extracted first data according to personal name may provide an entity with the ability to gain a quick and comprehensive overview of the personal details associated with a particular individual.

The organized data may be maintained in profiles according to personal name. At 710, the first data may be added to a first profile associated with the first personal name. For example, the hash of a first personal name and the other extracted first data indicative the first item of personal identifying information and the second item of personal identifying information may be maintained in a first profile associated with the first personal name. The first profile(s) may be viewable, such as by an entity, via one or more user interface device(s).

At 712, it may be determined that a different (i.e., second) table is included in second content. The second table includes a second plurality of rows and a second plurality of columns. The second content may belong to the same or a different content source as the first content. It may be determined that the second table includes a header row. The header row may include, in a first column, a label indicative of a personal name. At 714, it may be determined that a second term (i.e., label) indicative of a personal name is included in a first row of the second plurality of rows and a first column of the second plurality of columns. The second term may be the same as or different from the first term included in the header of the first table.

It may be determined that at least one other column of the second table includes personal identifying information. For example, it may be determined that at least one other column of the second table includes phone number(s), physical address(es), job titles, email address(es), or any other item of personal identifying information. At 716, a second row of the second plurality of rows that includes the first personal name in the first column of the second plurality of columns may be identified. The second row of the second plurality of rows may include at least one of the first item of personal identifying information (included in the first table) or the second item of personal identifying information (included in the first table) in a second column of the second plurality of columns. The second row of the second plurality of rows may also include a third item of personal identifying information in a third column of the second plurality of columns. The third item of personal identifying information may not be included in the first table.

It can be determined that the first personal name included in both the first table and second table correspond to the same individual because the first personal name is associated with at least one same item of personal identifying information in both the first and second tables. This determination can be made because it is highly unlikely (or impossible) for two different individuals to share the same item of personal identifying information, such as a job title, physical address, phone number, email address, etc. Thus, it can be determined that the third item of personal identifying information included in the third column of the second table is associated with that same individual.

At 718, second data indicative of the third item of personal identifying information may be extracted from the second table. Because the third item of personal identifying information is associated with the individual corresponding to the first profile, the third item of personal identifying information may be maintained or stored in the first profile along with the first and/or second items of personal identifying information from the first table. At 720, the second data may be added to the first profile.

At 722, it may be determined that a different (i.e., third) table is included in third content. The third table includes a third plurality of rows and a third plurality of columns. The third content may belong to the same or a different content source as the first and/or second content. It may be determined that the third table includes a header row. The header row may include, in a first column, a label indicative of a personal name. At 724, it may be determined that a third term (i.e., label) indicative of a personal name is included in a first row of the third plurality of rows and a first column of the third plurality of columns. The third term may be the same as or different from the first term included in the header row of the first table or the second term included in the header row of the second table.

It may be determined that at least one other column of the second table includes personal identifying information. For example, it may be determined that at least one other column of the second table includes phone number(s), physical address(es), job titles, email address(es), or any other item of personal identifying information. At 726, a second row of the third plurality of rows that includes the first personal name in the first column may be identified. The second row of the third plurality of tows may include the third item of personal identifying information in a second column of the third plurality of columns, and a fourth item of personal identifying information in a third column of the third plurality of columns.

It can be determined that the first personal name included in both the second table and third table correspond to the same individual because the first personal name is associated with the third item of personal identifying information in both the second and third tables. This determination can be made because it is highly unlikely (or impossible) for two different individuals to share the same item of personal identifying information, such as a job title, physical address, phone number, email address, etc. Thus, it can be determined that the fourth item of personal identifying information included in the third column of the third table is also associated with that same individual.

At 728, third data indicative of the fourth item of personal identifying information may be extracted from the third table. Because the fourth item of personal identifying information is associated with the individual corresponding to the first profile, the fourth item of personal identifying information may be maintained or stored in the first profile along with the first, second, and/or third items of personal identifying information from the first table and the second table. At 730, the third data may be added to the first profile.

FIG. 8 illustrates an exemplary method 800 for capturing and categorizing data. The method 800 may be performed, for example, by the processor 102 of FIG. 1. The method 800 may be performed to capture personal identifying information from variety of different data sources, such as tens, hundreds, thousands, or millions of data sources, and organize the captured data into profiles according to individual. In this manner, performance of the method 800 enables entities to quickly gain a comprehensive understanding of various personal details corresponding to particular individuals.

As described above, a processor (i.e., the content analysis component 104) may be configured to determine whether content includes one or more tables. At 802, it may be determined that at least one first table is included in first content. The first table includes a first plurality of rows and a first plurality of columns.

It may be determined that the first table includes a header row. The header row may include, in a first column, a label indicative of a personal name. At 804, it may be determined that a first term (i.e., label) indicative of a personal name is included in a first row (i.e., header row) of the first plurality of rows and a first column of the first plurality of columns. As described above, a label indicative of a personal name is not an actual personal name. Rather, a label indicative of a personal name may be, for example, the word "name" or characters for "name" written in any language, the phrases "legal name," "English name," "First and Last Name" (in any language) etc.

It may be determined that at least one other column of the first table includes personal identifying information. For example, it may be determined that at least one other column of the first table includes phone number(s), physical address(es), job titles, email address(es), or any other item of personal identifying information. At 806, a second row of the first plurality of rows that includes at least a first personal name in the first column and a first item of personal identifying information in a second column of the first plurality of columns may be identified.

Data from this second row of the first table may be extracted. At 808, first data indicative of the first personal name and the first item of personal identifying information may be extracted. The extracted first data may be organized according to personal name (i.e., by individual). For example, a hash of the first personal name may be created, and the other extracted data indicative the first item of personal identifying information may be associated to the first personal name. In this manner, the extracted first data may be inverted so that it is arranged according to personal name. Arranging the extracted first data according to personal name may provide an entity with the ability to gain a quick and comprehensive overview of the personal details associated with a particular individual.

The organized data may be maintained in profiles according to personal name. At 810, the first data may be added to a first profile associated with the first personal name. For example, the hash of a first personal name and the other extracted first data indicative the first item of personal identifying information may be maintained in a first profile associated with the first personal name. The first profile(s) may be viewable, such as by an entity, via one or more user interface device(s).

At 812, it may be determined that a different (i.e., second) table is included in second content. The second table includes a second plurality of rows and a second plurality of columns. The second content may belong to the same or a different content source as the first content. It may be determined that the second table includes a header row. The header row may include, in a first column, a label indicative of a personal name. At 814, it may be determined that a second term (i.e., label) indicative of a personal name is included in a first row of the second plurality of rows and a first column of the second plurality of columns. The second term may be the same as or different from the first term included in the header of the first table.

It may be determined that at least one other column of the second table includes personal identifying information. For example, it may be determined that at least one other column of the second table includes phone number(s), physical address(es), job titles, email address(es), or any other item of personal identifying information. At 816, a second row of the second plurality of rows that includes the first personal name in the first column of the second plurality of columns may be identified. The second row of the second plurality of rows may include a second item of personal identifying information in a second column of the second plurality of columns.

The second item of personal identifying information may conflict with the first item of personal identifying information included in the first table. For example, the first item of personal identifying information may include an identifier that is unique to a first individual, and the second item of personal identifying information may include a different identifier that is unique to a second individual. The identifier may indicate at least one of an email address, a physical address, a phone number, or a job title of the first individual and the different identifier indicates at least one of a different email address, a different physical address, a different phone number, or a different job title of the second individual.

If the second item of personal identifying information conflicts with the first item of personal identifying information, it may be determined that the first item of personal identifying information is associated with a first individual and the second item of personal identifying information is associated with a second individual. The first individual and the second individual may be two different people who share the same name.

Data from this second row of the second table may be extracted. At 818, second data indicative of the first personal name and the second item of personal identifying information may be extracted. The extracted first data may be organized according to personal name (i.e., by individual). For example, a hash of the first personal name may be created, and the other extracted data indicative the second item of personal identifying information may be associated to the first personal name. In this manner, the extracted second data may be inverted so that it is arranged according to personal name. Arranging the extracted second data according to personal name may provide an entity with the ability to gain a quick and comprehensive overview of the personal details associated with a particular individual.

The organized data may be maintained in profiles according to personal name. At 820, the second data may be added to a second profile associated with the first personal name. For example, the hash of the second personal name and the other extracted second data indicative the second item of personal identifying information may be maintained in a second profile associated with the first personal name. The second profile(s) may be viewable, such as by an entity, via one or more user interface device(s).

While the above description assumes that the tables found in content are oriented in such a manner that a "header row" is a row in the table, it should be appreciated that in certain embodiments, one or more tables found in content may be oriented in such a manner that a "header row" is actually a column (i.e., a "header column"). For example, if a table found in content is oriented in such a manner that the table includes a "header column," that table may include labels in each row of the header column that indicate a type of data that is stored in the other columns of the corresponding row. All of the above description may still be applicable if the "header row" is actually a "header column." For example, if the "header row" is actually a "header column," the word "row" may be substituted for the word "column" in any portion of the above description.

Figure 9:
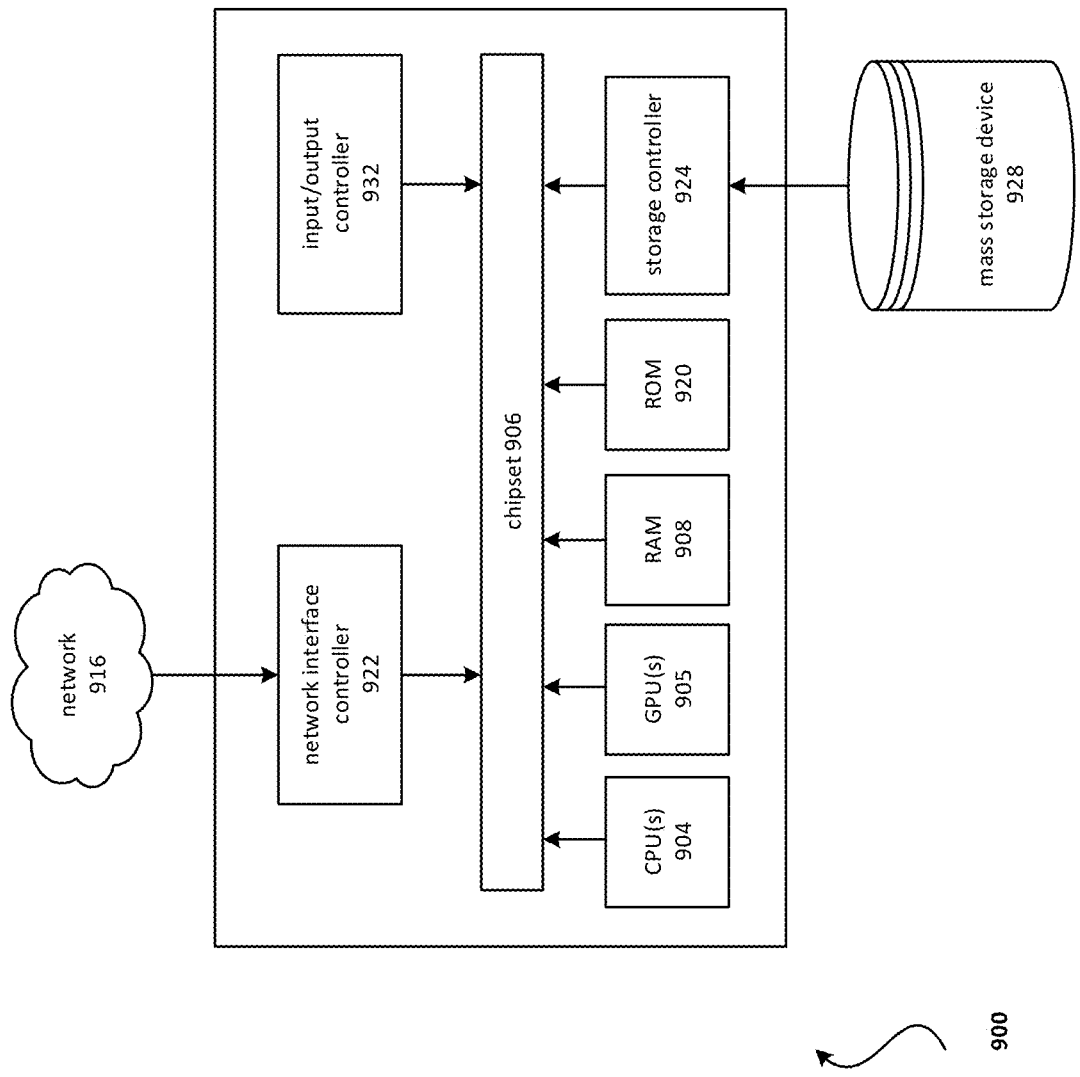
FIG. 9 illustrates a block diagram of an example computing device.

FIG. 9 depicts a computing device that may be used in various aspects. With regard to the example environment of FIG. 1, one or more of the processor 102, electronic storage 110, user interface device(s) 114, or content source(s) 120 may be implemented in an instance of a computing device 900 of FIG. 9. The computer architecture shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIGS. 7A, 7B, 7C, and 8.

The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A user interface may be provided between the CPU(s) 904 and the remainder of the components and devices on the baseboard. The interface may be used to access a random access memory (RAM) 908 used as the main memory in the computing device 900. The interface may be used to access a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein. The user interface may be provided by a one or more electrical components such as the chipset 906.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a storage device 928 that provides non-volatile storage for the computer. The storage device 928 may store system programs, application programs, other program modules, and data, which have been described in greater detail herein. The storage device 928 may be connected to the computing device 900 through a storage controller 924 connected to the chipset 906. The storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 928 is characterized as primary or secondary storage and the like.

For example, the computing device 900 may store information to the storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may read information from the storage device 928 by detecting the physical states or characteristics of one or more particular locations within the physical storage units.

In addition to or alternatively to the storage device 928 described herein, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 928 may store other system or application programs and data utilized by the computing device 900.

The storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described herein. The computing device 900 may have access to computer-readable storage media storing computer-executable instructions, which, when executed by the computing device 900, may perform the methods described in relation to FIGS. 7A, 7B, 7C, and 8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining at least one table included in first content, wherein the at least one table includes a first plurality of rows and a first plurality of columns;
    determining that a first term indicative of a personal name is included in a first row of the first plurality of rows and a first column of the first plurality of columns;
    identifying a second row of the first plurality of rows that includes at least a first personal name in the first column and a first item of personal identifying information in a second column of the first plurality of columns;
    extracting first data indicative of the first personal name and the first item of personal identifying information;
    adding the first data to a first profile associated with the first personal name;
    extracting second data indicative of the first personal name and a second item of personal identifying information;
    determining that the second item of personal identifying information conflicts with the first item of personal identifying information; and
    adding, in response to the determination that the second item of personal identifying information conflicts with the first item of personal identifying information, the second data to a second profile associated with the first personal name that is different from the first profile associated with the first personal name.

2. The method of claim 1, wherein extracting the second data indicative of the first personal name and the second item of personal identifying information comprises identifying a third row of the first plurality of rows that includes at least the first personal name in the first column and the second item of personal identifying information in the second column of the first plurality of columns.

3. The method of claim 1, wherein extracting the second data indicative of the first personal name and the second item of personal identifying information comprises:
    determining a different table included in second content, wherein the different table includes a second plurality of rows and a second plurality of columns;
    determining that a second term indicative of a personal name is included in a first row of the second plurality of rows and a first column of the second plurality of columns; and
    identifying a second row of the second plurality of rows that includes the first personal name in the first column of the second plurality of columns and the second item of personal identifying information in a second column of the second plurality of columns.

4. The method of claim 3, further comprising:
    receiving the first content from a first website; and
    receiving the second content from a second website that is different from the first website.

5. The method of claim 3, further comprising adding, to the second profile, an indication associating the second data to the second content.

6. The method of claim 1, wherein determining that the second item of personal identifying information conflicts with the first item of personal identifying information comprises determining that the first item of personal identifying information is associated with a first individual and the second item of personal identifying information is associated with a second individual that is different from the first individual.

7. The method of claim 6, wherein the first profile is associated with the first individual and the second profile is associated with the second individual.

8. The method of claim 1, wherein the first item of personal identifying information includes an identifier that is unique to a first individual, and wherein determining that the second item of personal identifying information conflicts with the first item of personal identifying information comprises:
    determining that the second item of personal identifying information includes a different identifier that is unique to a second individual.

9. The method of claim 8, wherein the identifier that is unique to the first individual indicates at least one of an email address, a physical address, a phone number, or a job title of the first individual that is different from the different identifier that is unique to the second individual that indicates at least one of a different email address, a different physical address, a different phone number, or a different job title of the second individual.

10. The method of claim 1, wherein extracting the first data indicative of the first personal name and the first item of personal identifying information comprises:
    creating a hash of the first personal name and associating the first item of personal identifying information to the first personal name.

11. The method of claim 1, wherein adding the first data to the first profile associated with the first personal name comprises sending the first data to a database storing the first profile associated with the first personal name.

12. The method of claim 11, wherein the database stores a plurality of profiles associated with a plurality of personal names, the plurality of profiles including the first profile and the second profile.

13. The method of claim 1, wherein extracting the first data indicative of the first personal name and the first item of personal identifying information comprises not extracting information from rows with missing data in one or more columns.

14. The method of claim 1, further comprising determining a language associated with the first content, and wherein determining that the first term indicative of the personal name is included in the first row of the first plurality of rows and the first column of the first plurality of columns comprises:
identifying at least one of a word, phrase, letter, or character associated with the language that is indicative of personal names but does not comprise a first name or a last name of an individual.

15. The method of claim 1, wherein the first term indicative of the personal name does not comprise a first name or a last name of an individual.

16. The method of claim 1, wherein the first personal name indicates at least one of a first name or a last name of an individual.

17. The method of claim 1, wherein the first item of personal identifying information indicates at least one of an email address, a physical address, a phone number, or a job title of an individual associated with the first personal name.

18. The method of claim 1, further comprising adding, to the first profile, an indication associating the first data to the first content.

19. An apparatus comprising:
one or more processors; and
memory storing instructions that, when executed by the one or more processors, cause:
 determining at least one table included in first content, wherein the at least one table includes a first plurality of rows and a first plurality of columns;
 determining that a first term indicative of a personal name is included in a first row of the first plurality of rows and a first column of the first plurality of columns;
 identifying a second row of the first plurality of rows that includes at least a first personal name in the first column and a first item of personal identifying information in a second column of the first plurality of columns;
 extracting first data indicative of the first personal name and the first item of personal identifying information;
 adding the first data to a first profile associated with the first personal name;
 extracting second data indicative of the first personal name and a second item of personal identifying information;
 determining that the second item of personal identifying information conflicts with the first item of personal identifying information; and
 adding, in response to the determination that the second item of personal identifying information conflicts with the first item of personal identifying information, the second data to a second profile associated with the first personal name that is different from the first profile associated with the first personal name.

20. A non-transitory computer-readable medium storing instructions that, when executed, cause:
 determining at least one table included in first content, wherein the at least one table includes a first plurality of rows and a first plurality of columns;
 determining that a first term indicative of a personal name is included in a first row of the first plurality of rows and a first column of the first plurality of columns;
 identifying a second row of the first plurality of rows that includes at least a first personal name in the first column and a first item of personal identifying information in a second column of the first plurality of columns;
 extracting first data indicative of the first personal name and the first item of personal identifying information;
 adding the first data to a first profile associated with the first personal name;
 extracting second data indicative of the first personal name and a second item of personal identifying information;
 determining that the second item of personal identifying information conflicts with the first item of personal identifying information; and
 adding, in response to the determination that the second item of personal identifying information conflicts with the first item of personal identifying information, the second data to a second profile associated with the first personal name that is different from the first profile associated with the first personal name.

* * * * *